(12) United States Patent
Nakagawa et al.

(10) Patent No.: US 10,955,727 B2
(45) Date of Patent: Mar. 23, 2021

(54) WAVELENGTH CONVERTER AND TRANSMISSION APPARATUS

(71) Applicant: FUJITSU LIMITED, Kawasaki (JP)

(72) Inventors: Goji Nakagawa, Sagamihara (JP); Tomoyuki Kato, Yokohama (JP); Takeshi Hoshida, Kawasaki (JP); Masaaki Kawai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/781,079

(22) Filed: Feb. 4, 2020

(65) Prior Publication Data

US 2020/0264492 A1    Aug. 20, 2020

(30) Foreign Application Priority Data

Feb. 15, 2019    (JP) .............................. JP2019-025551

(51) Int. Cl.
G02F 1/365 (2006.01)
G02F 1/35 (2006.01)
G02B 27/10 (2006.01)

(52) U.S. Cl.
CPC ......... G02F 1/365 (2013.01); G02B 27/1006 (2013.01); G02F 1/3536 (2013.01); G02F 2201/02 (2013.01); G02F 2203/60 (2013.01)

(58) Field of Classification Search
CPC ............................... G02F 1/3536; G02F 1/365
See application file for complete search history.

(56) References Cited

U.S. PATENT DOCUMENTS

| | | | |
|---|---|---|---|
| 6,744,553 B1 * | 6/2004 | Islam | G02F 1/3536 359/326 |
| 6,963,675 B2 * | 11/2005 | Watanabe | G02F 1/3538 385/11 |
| 2005/0264871 A1 | 12/2005 | Takahashi et al. | |

FOREIGN PATENT DOCUMENTS

| | | |
|---|---|---|
| JP | 2004-207677 | 7/2004 |
| JP | 2005-301009 | 10/2005 |
| JP | 2009-294324 | 12/2009 |

* cited by examiner

*Primary Examiner* — Omar R Rojas
(74) *Attorney, Agent, or Firm* — Fujitsu Patent Center

(57) ABSTRACT

A wavelength converter includes an excitation light source outputting excitation light, a beam splitter receiving an input of the excitation light and an input of the optical signal and to divide both the inputted excitation light and the inputted optical signal into a first polarization component and a second polarization component, a non-linear optical fiber as a non-polarization-maintaining fiber, an accommodation section securing and accommodating the non-linear optical fiber, a first collimator lens disposed between the beam splitter and a first end of the non-linear optical fiber, and a second collimator lens disposed between the beam splitter and a second end of the non-linear optical fiber, wherein the optical signal is inputted to the beam splitter from a direction different from the input of the excitation light.

8 Claims, 11 Drawing Sheets

WAVELENGTH CONVERTER AND TRANSMISSION APPARATUS

CROSS-REFERENCE TO RELATED APPLICATION

This application is based upon and claims the benefit of priority of the prior Japanese Patent Application No. 2019-25551, flied on Feb. 15, 2019, the entire contents of which are incorporated herein by reference.

FIELD

An embodiment discussed herein is related to a wavelength converter and a transmission apparatus.

BACKGROUND

In recent years, it is demanded that a transmission capacity be enlarged to cope with an increase in communication demand. The transmission capacity can be enlarged, for example, by increasing the number of optical fiber cores.

However, as a cost of fiber optic construction is high, it is demanded that the transmission capacity be enlarged without increasing the number of optical fiber cores.

As for a transmission apparatus, the enlargement of the transmission capacity is limited when only a conventional band (C band) is used for communication. To enlarge the transmission capacity, it is desirable to use, in addition to the C band, a long band (L band) in a long wavelength band, and a short band (S band) in a short wavelength band, for example.

In a case where, for example, an optical transceiver, a wavelength multiplexer/demultiplexer, and an optical amplifier are individually developed for the S band, the C band, and the L band, it may be required to develop transmission apparatuses adapted for the use of the L and S bands in addition to a transmission apparatus adapted for the use of the C band only, causing high cost.

In view of this, it is conceivable that a low-cost broadband transmission system may be configured by employing C band parts and allowing a wavelength converter to convert the C band parts to equivalents for the other bands such as the L and S bands.

Meanwhile, there is a wavelength conversion technology that inputs excitation light and an optical signal to a highly non-linear fiber (HNLF). Such a technology for accommodating the HNLF is disdosed, for example, in Japanese Laid-open Patent Publication No. 2004-207677, Japanese Laid-open Patent Publication No. 2005-301009, and Japanese Laid-open Patent Publication No. 2009-294324.

SUMMARY

According to an aspect of the embodiment, a wavelength converter for converting a wavelength of an optical signal, the wavelength converter includes an excitation light source configured to output excitation light, a beam splitter configured to receive an input of the excitation light and an input of the optical signal and to divide both the inputted excitation light and the inputted optical signal into a first polarization component and a second polarization component, a non-linear optical fiber configured as a non-polarization-maintaining fiber, an accommodation section configured to secure and accommodate the non-linear optical fiber, a first collimator lens disposed between the beam splitter and a first end of the non-linear optical fiber, and a second collimator lens disposed between the beam splitter and a second end of the non-linear optical fiber, wherein the optical signal is inputted to the beam splitter from a direction different from the input of the excitation light, and the optical signal is wavelength-converted by inputting the first polarization component of the excitation light and the second polarization component of the optical signal from the first end to the non-linear optical fiber through the first collimator lens and inputting the second polarization component of the excitation light and the first polarization component of the optical signal from the second end to the non-linear optical fiber through the second collimator lens.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a case where excitation light and an optical signal are to be inputted to the HNLF with different polarizations for wavelength conversion purposes, it may be required that polarization division be performed with a polarization beam splitter (PBS). To enhance wavelength conversion efficiency, it is desirable to perform polarization division in such a manner as to equalize polarization components.

Accordingly, it is conceivable that a fiber having characteristics of both the HNLF and a polarization maintaining fiber (PMF) may be used. However, the PMF is designed to be significantly birefringent. Therefore, a refractive index error occurs between a core and a cladding, which are included in an optical fiber. Due to a difference in refractive index, the polarization of excitation light and the polarization of an optical signal differ in speed of light in the optical fiber. This makes it impossible to perform wavelength conversion.

Consequently, in a case where an employed configuration performs wavelength conversion by making the polarization of excitation light orthogonal to the polarization of the optical signal, it is preferable that a non-PMF type HNLF be used.

However, the non-PMF type incurs polarization rotation in the optical fiber due to external vibration. This causes a problem where wavelength-converted light is blocked by the PBS because an angle of incidence on the PBS is not orthogonal.

An optical fiber has been coupled to an input interface and an output interface that are disposed outside a fiber accommodation section. In a case where the PBS is coupled to the optical fiber, the fiber accommodation section and the PBS relatively vary, so that polarization varies in the optical fiber outside the fiber accommodation section. This causes a problem where desired characteristics are not obtained because a wavelength-converted optical signal is blocked by the PBS.

The present disclosure described below is capable of maintaining an optical signal to be inputted to a PBS in a fixed polarization state, and outputting a wavelength-converted signal having desired characteristics.

Disclosed configurations make it possible to maintain a non-linear optical fiber in a fixed polarization state and provide a transmission system at a low cost.

First Embodiment

Figure 1:
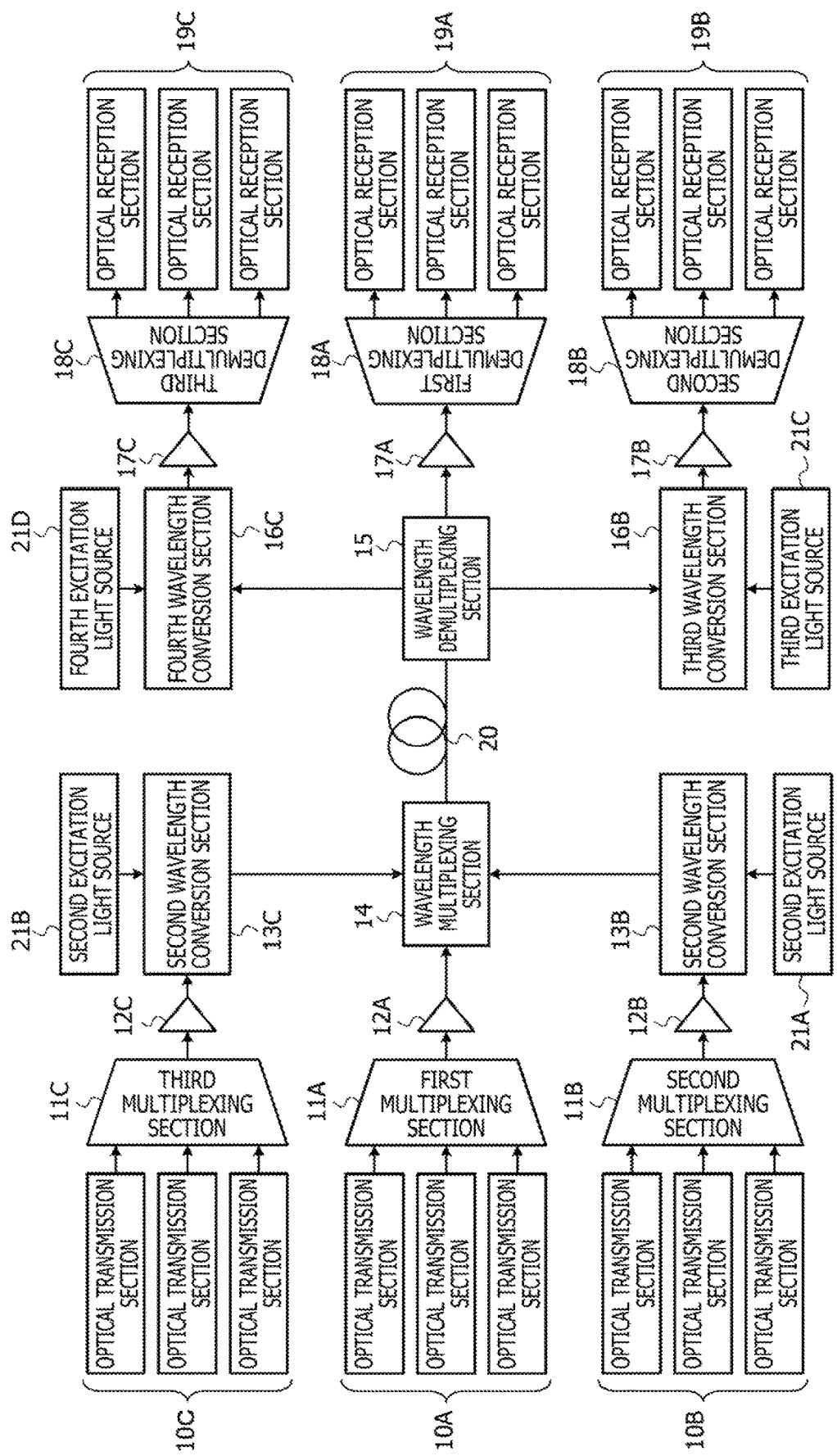
FIG. 1 is a simplified diagram illustrating an embodiment of a transmission system.

FIG. 1 is a simplified diagram illustrating an embodiment of a transmission system. A transmission system depicted in FIG. 1 includes a first transmission apparatus, a second transmission apparatus, and a transmission path 20 such as an optical fiber that transmits wavelength-multiplexed light between the first transmission apparatus and the second transmission apparatus. The first transmission apparatus includes a plurality of optical transmission sections 10, a plurality of multiplexing sections 11, a plurality of optical amplifier sections 12, a plurality of wavelength conversion sections 13, a plurality of excitation light sources 21, and a wavelength multiplexing section 14.

The plurality of optical transmission sections 10 include a plurality of optical transmission sections 10A for a first group, a plurality of optical transmission sections 10B for a second group, and a plurality of optical transmission sections 10C for a third group. The optical transmission sections 10A for the first group each transmit first light having a different wavelength within a C band wavelength range (e.g., 1530 nm to 1565 nm). The optical transmission sections 10B for the second group each transmit second light having a different wavelength within the C band wavelength range. The optical transmission sections 10C for the third group each transmit third light having a different wavelength within the C band wavelength range. The optical transmission sections 10A, the optical transmission sections 10B, and the optical transmission sections 10C are the optical transmission sections 10 for the C band.

The multiplexing sections 11 include, for example, a first multiplexing section 11A for the first group, a second multiplexing section 11B for the second group, and a third multiplexing section 11C for the third group. The optical amplifier sections 12 include a first optical amplifier section 12A for the first group, a second optical amplifier section 12B for the second group, and a third optical amplifier section 12C for the third group. The wavelength conversion section 13 allow multiplex light and excitation light to propagate from the excitation light sources 21 to a non-linear optical medium in order to convert the multiplex light to multiplex light of a predetermined wavelength band. The wavelength conversion sections 13 include a first wavelength conversion section 13B for the second group and a second wavelength conversion section 13C for the third group.

The first multiplexing section 11A is a first multiplexing section multiplexing the first light transmitted from each optical transmission section 10A in the first group, obtaining first multiplex light, and outputting the obtained first multiplex light to the first optical amplifier section 12A. The transmission band of each port of the first multiplexing section 11A is designed in accordance with the band of the first light outputted from each optical transmission section 10A. In the present embodiment, the transmission band of each port is designed in accordance with the C band. The first optical amplifier section 12A receives the first multiplex light from the first multiplexing section 11A, optically amplifies the received first multiplex light, and outputs the optically-amplified first multiplex light to the wavelength multiplexing section 14. The first multiplex light is multiplex light in the C band, which is a first wavelength band.

The second multiplexing section 11B is a second multiplexing section multiplexing the second light transmitted from each optical transmission section 10B in the second group, obtaining second multiplex light, and outputting the obtained second multiplex light to the second optical amplifier section 12B. The transmission band of each port of the second multiplexing section 11B is designed in accordance with the band of the second light outputted from each optical transmission section 10B. In the present embodiment, the transmission band of each port is designed in accordance with the C band. The second optical amplifier section 12B receives the second multiplex light from the second multiplexing section 11B, optically amplifies the received second multiplex light, and outputs the optically-amplified second multiplex light to the first wavelength conversion section 13B. The second multiplex light is multiplex light in the C band. A first excitation light source 21A outputs excitation light to the first wavelength conversion section 13B. The first wavelength conversion section 13B receives the second multiplex light in the C band from the second optical amplifier section 12B, wavelength-converts the received second multiplex light in the C band to the second multiplex light in the L band, and outputs the wavelength-converted second multiplex light to the wavelength multiplexing section 14. The wavelength range of the L band, which is a second wavelength band, is a long wavelength band, for example, of 1565 nm to 1625 nm.

The third multiplexing section 11C is a third multiplexing section multiplexing the third light transmitted from each optical transmission section 10C in the third group, obtaining third multiplex light, outputting the obtained third multiplex light to the third optical amplifier section 12C. The transmission band of each port of the third multiplexing section 11C is designed in accordance with the band of the third light outputted from each optical transmission section 10C. In the present embodiment, the transmission band of each port is designed in accordance with the C band. The third optical amplifier section 12C receives the third multiplex light from the third multiplexing section 11C, optically amplifies the received third multiplex light, and outputs the optically-amplified third multiplex light to the second wavelength conversion section 13C. The third multiplex light is multiplex light in the C band. A second excitation light source 21B outputs excitation light to the second wavelength conversion section 13C. The second wavelength conversion section 13C receives the third multiplex light in the C band from the third optical amplifier section 12C, wavelength-converts the received third multiplex light in the C band to the third multiplex light in the S band, and outputs the wavelength-converted third multiplex light to the wavelength multiplexing section 14. The wavelength range of the S band, which is a third wavelength band, is a short wavelength band, for example, of 1460 nm to 1530 nm.

The wavelength multiplexing section 14 is a fourth multiplexing section obtaining multiplex light by multiplexing the first multiplex light in the C band, the second multiplex light in the L band, and the third multiplex light in the S band, and outputting the obtained multiplex light to the transmission path 20.

As described above, the transmission band of each port of the multiplexing sections 11 may be designed in accordance with the C band. Therefore, common parts may be used for the multiplexing sections 11.

The second transmission apparatus includes a wavelength demultiplexing section 15, a plurality of wavelength conversion sections 16, a plurality of excitation light sources 21, a plurality of optical amplifier sections 17, a plurality of demultiplexing sections 18, and a plurality of optical reception sections 19. The wavelength conversion sections 16 include a third wavelength conversion section 16B for the second group and a fourth wavelength conversion section 16C for the third group.

The optical amplifier sections 17 include a first optical amplifier section 17A for the first group, a second optical amplifier section 17B for the second group, and a third optical amplifier section 17C for the third group. First multiplex light, second multiplex light, and third multiplex light in the C band are inputted to the respective optical amplifier sections 17. Therefore, an erbium doped optical fiber amplifier (EDFA) capable of efficiently amplifying light having a wavelength in the C band is applied. The demultiplexing sections 18 include a first demultiplexing section 18A for the first group, a second demultiplexing section 18B for the second group, and a third demultiplexing section 18C for the third group. The optical reception sections 19 include a plurality of optical reception sections 19A for the first group, a plurality of optical reception sections 19B for the second group, and a plurality of optical reception sections 19C for the third group. The optical reception sections 19A, the optical reception sections 19B, and the optical reception sections 19C are optical reception sections 19 for the C band.

The wavelength demultiplexing section 15 is a first division section receiving multiplex light from the transmission path 20, and demultiplexing the received multiplex light into first multiplex light in the C band, second multiplex light in the L band, and third multiplex light in the S band. The wavelength demultiplexing section 15 outputs the demultiplexed first multiplex light in the C band to the first optical amplifier section 17A. The first optical amplifier section 17A receives the first multiplex light in the C band from the wavelength demultiplexing section 15, optically amplifies the received first multiplex light in the C band, and outputs the optically-amplified first multiplex light in the C band to the first demultiplexing section 18A. The first demultiplexing section 18A is a second division section receiving the first multiplex light in the C band from the first optical amplifier section 17A, demultiplexing the received first multiplex light in the C band into first light, and outputting each demultiplexed first light to each optical reception section 19A. The transmission band of each output port of the first demultiplexing section 18A is designed in accordance with the band of a wavelength received by a coupled optical reception section 19A. As the band of the wavelength received by the optical reception sections 19A is the C band, the transmission band is designed in accordance with the C band wavelength.

The wavelength demultiplexing section 15 outputs the demultiplexed second multiplex light in the L band to the third wavelength conversion section 16B. The third wavelength conversion section 16B allows excitation light from a third excitation light source 21C and second multiplex light in the L band to propagate to a non-linear optical medium, wavelength-converts the second multiplex light in the L band to second multiplex light in the C band, and outputs the wavelength-converted second multiplex light in the C band to the second optical amplifier section 17B. The second optical amplifier section 17B receives the second multiplex light in the C band from the third wavelength conversion section 16B, optically amplifies the received second multiplex light in the C band, and outputs the optically-amplified second multiplex light in the C band to the second demultiplexing section 18B. The second demultiplexing section 18B is a third division section receiving the second multiplex light in the C band from the second optical amplifier section 17B, demultiplexing the received second multiplex light in the C band into second light, and outputting each demultiplexed second light to each optical reception section 19B. The transmission band of each output port of the second demultiplexing section 18B is designed in accordance with the band of a wavelength received by a coupled optical reception section 19B. As the band of the wavelength received by the optical reception sections 19B is the C band, the transmission band is designed in accordance with the C band wavelength.

The wavelength demultiplexing section 15 outputs the demultiplexed third multiplex light in the S band to the fourth wavelength conversion section 16C. The fourth wavelength conversion section 16C allows excitation light from a fourth excitation light source 21D and third multiplex light in the S band to propagate to a non-linear optical medium and accordingly wavelength-converts the third multiplex light in the S band to third multiplex light in the C band, and outputs the wavelength-converted third multiplex light in the C band to the third optical amplifier section 17C. The third optical amplifier section 17C receives the third multiplex light in the C band from the fourth wavelength conversion section 16C, optically amplifies the received third multiplex light in the C band, and outputs the optically-amplified third multiplex light in the C band to the third demultiplexing section 18C. The third demultiplexing section 18C is a fourth division section receiving the third multiplex light in the C band from the third optical amplifier section 17C, demultiplexing the received third multiplex light in the C band into third light, and outputting each demultiplexed third light to each optical reception section 19C. The transmission band of each output port of the third demultiplexing section 18C is designed in accordance with the band of a wavelength received by a coupled optical reception section 19C. As the band of the wavelength received by the optical reception sections 19C is the C band, the transmission band is designed in accordance with the C band wavelength.

Figure 2:
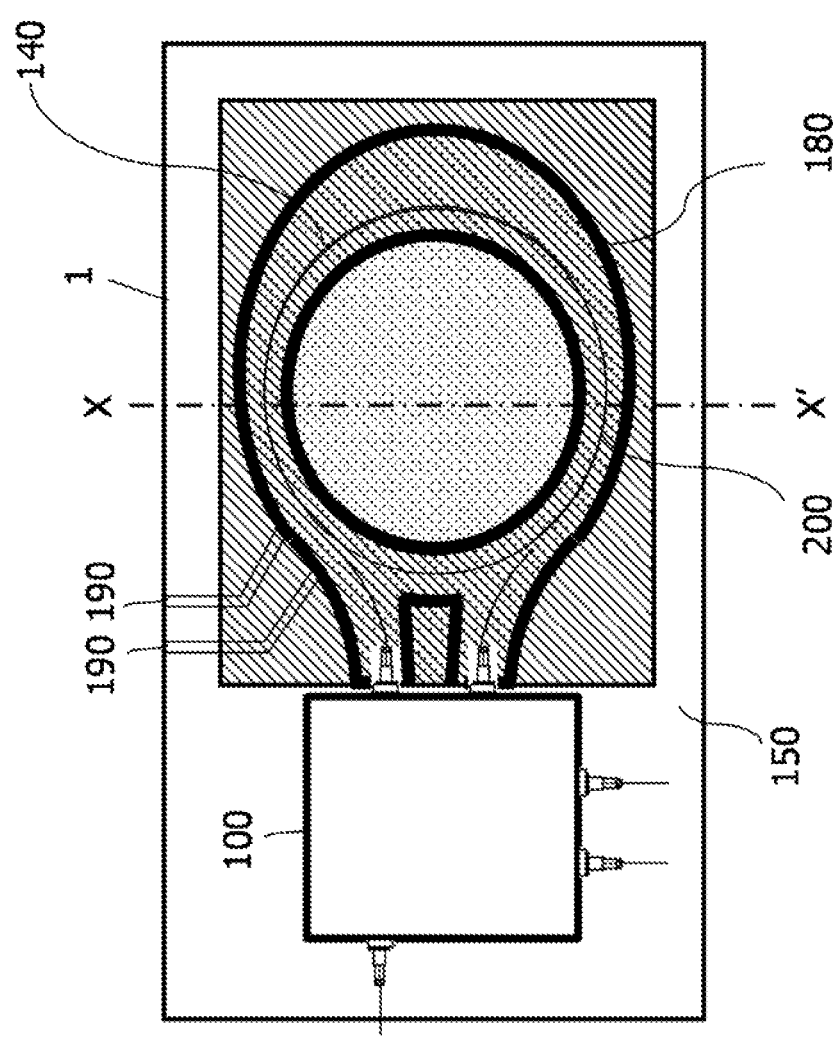
FIG. 2 is a simplified diagram illustrating a wavelength converter according to a first embodiment of the present disclosure.

FIG. 2 is a diagram illustrating a wavelength converter corresponding to a wavelength conversion sections 13 or a wavelength conversion sections 16 in FIG. 1. The wavelength converter 1 will now be described with reference to FIG. 2.

Figure 3:
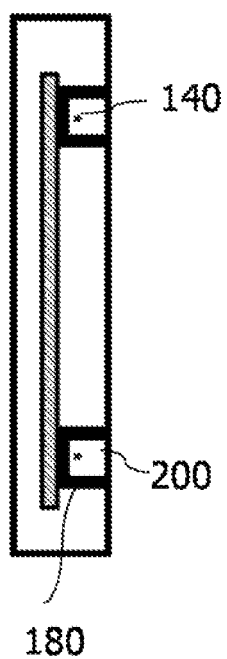
FIG. 3 is a cross-sectional view illustrating a fiber holder section according to the first embodiment of the present disclosure.

The wavelength converter 1 depicted in FIG. 2 performs wavelength conversion. The wavelength converter 1 includes an optical function section 100, a non-linear optical fiber 140 (hereinafter referred to as the optical fiber), a fiber holder section 180, a temperature control section 190, and a filling material 200. The optical fiber 140 is used to perform wavelength conversion. The fiber holder section 180 inhibits the optical fiber 140 from being externally vibrated and displaced. The temperature control section 190 maintains the optical fiber 140, which is held by the fiber holder section 180, at a constant temperature. The filling material 200 suppresses the vibration of the optical fiber 140 in the fiber holder section 180. A retaining board 150 retains the wavelength converter 1. FIG. 3 is a cross-sectional view illustrating the fiber holder section 180 of the wavelength converter 1 according to the present disclosure.

Figure 4:
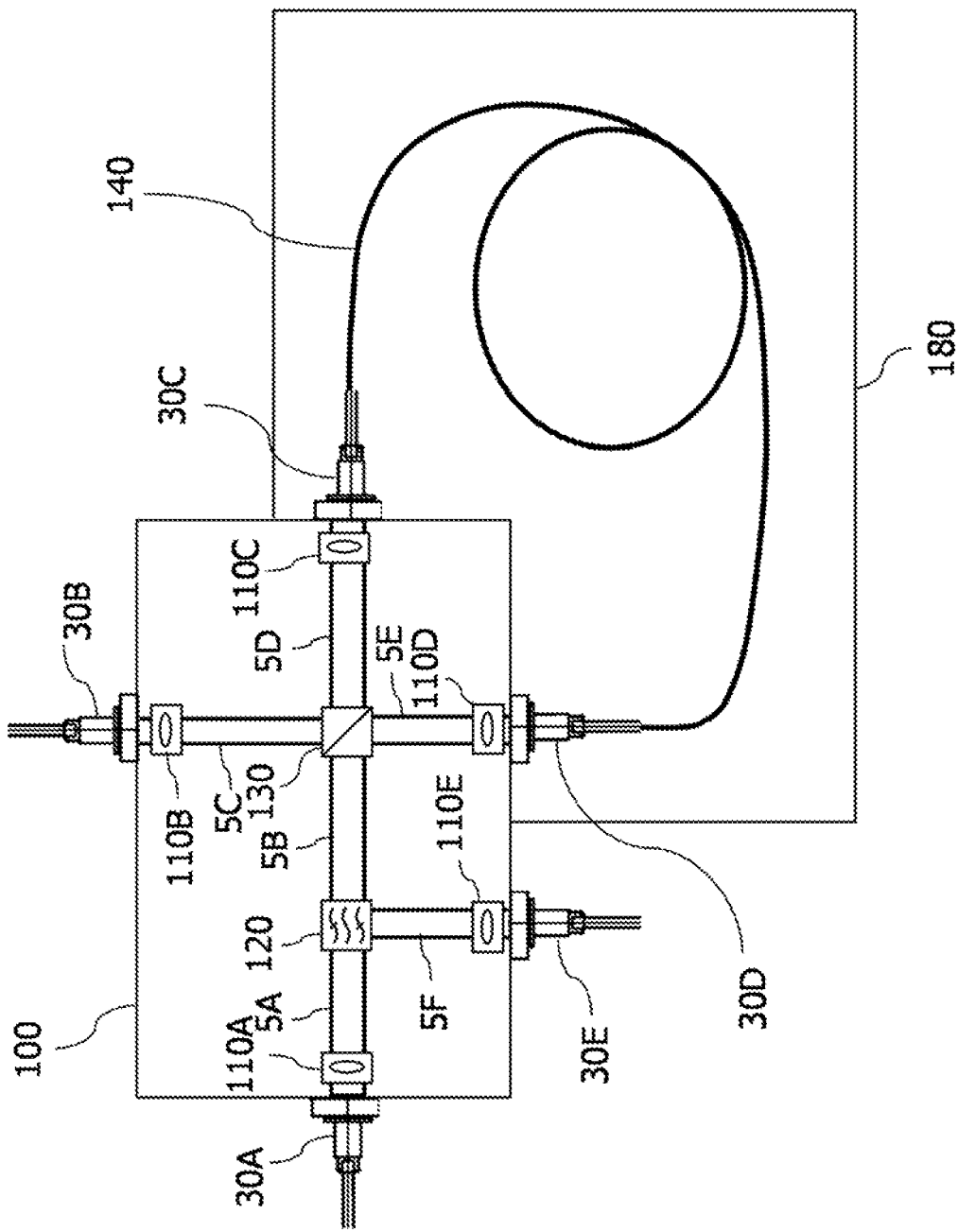
FIG. 4 is an explanatory diagram illustrating the first embodiment.

FIG. 4 is a detailed diagram illustrating the first wavelength conversion section 13B, the second wavelength conversion section 13C, the third wavelength conversion section 16B, and the fourth wavelength conversion section 16C, which are depicted in FIG. 1.

The optical function section 100 includes a collimator lens 110A, a collimator lens 110B, a collimator lens 110C, a collimator lens 110D, a collimator lens 110E, a wavelength filter 120, and a polarization beam splitter 130.

Spatial light coupling paths 5 are paths through which an optical signal, excitation light, and converted light pass when the optical signal, the excitation light, and the converted light are subjected to spatial light coupling. A spatial light coupling path 5A is a path through which an optical signal passes. A spatial light coupling path 5B is a path through which an optical signal and converted light pass. A spatial light coupling path 5C is a path through which excitation light passes. A spatial light coupling path 5D is a path through which an optical signal, excitation light, and converted light pass. A spatial light coupling path 5E is a path through which an optical signal, excitation light, and converted light pass. A spatial light coupling path 5F is a path through which converted light passes. A fiber connector 30A is used to input an optical signal to the optical function section 100 from the second optical amplifier section 12B, the third optical amplifier section 12C, and the wavelength demultiplexing section 15. A fiber connector 30B is used to input excitation light to the optical function section 100 from the first excitation light source 21A, the second excitation light source 21B, the third excitation light source 21C, and the fourth excitation light source 21D. A fiber connector 30C and a fiber connector 30D are used to couple the optical function section 100 to the optical fiber 140. A fiber connector 30E is used to receive wavelength-converted light from the optical function section 100 and output the received wavelength-converted light to the wavelength multiplexing section 14, the second optical amplifier section 17B, and the third optical amplifier section 17C.

An optical signal is inputted from the fiber connector 30A to the collimator lens 110A, and the optical signal from the fiber connector 30A is converted to parallel light. For example, an optical signal may be inputted through spatial light coupling. The wavelength filter 120 is used to reflect converted light that is wavelength-converted by the optical fiber 140. Excitation light is inputted from the fiber connector 30B to the collimator lens 110B, and the excitation light is converted to parallel light. The polarization beam splitter 130 is used to divide an optical signal and excitation light into their respective orthogonal components.

An optical signal and excitation light are subjected to spatial light coupling by the polarization beam splitter 130.

An optical loss of the optical signal and the excitation light may be also reduced. A polarization-maintaining fiber may be used as the optical fiber to be coupled to the fiber connectors 30A and 30B that input an optical signal and excitation light to the optical function section 100.

After being inputted to the optical function section 100, the optical signal passes through the wavelength filter 120, and the polarization of the optical signal is divided into orthogonal components by the polarization beam splitter 130 and divided into optical signal X-polarized light and optical signal Y-polarized light. Similarly, after being inputted to the optical function section 100, the excitation light is transmitted to the polarization beam splitter 130, and the polarization of the excitation light is divided into orthogonal components by the polarization beam splitter 130 and divided into excitation X-polarized light and excitation Y-polarized light.

The optical signal X-polarized light and the excitation Y-polarized light, which are obtained upon division, create an orthogonal state, and are outputted from the fiber connector 30D to the optical fiber 140 through the collimator lens 110D. The optical signal Y-polarized light and the excitation X-polarized light, which are obtained upon division, create an orthogonal state, and are outputted from the fiber connector 30C to the optical fiber 140 through the collimator lens 110C.

The optical fiber 140 is coupled to the fiber connector 30C and the fiber connector 30D. The optical fiber 140 is a polarization-independent optical fiber formed of a non-linear optical crystal. A connection section for outputting converted light to the optical function section 100 from the optical fiber 140 is coupled to the optical fiber 140 in a state in which the connection section is rotated 90 degrees from a connection section for inputting an optical signal from the optical function section 100 to the optical fiber 140.

The optical signal X-polarized light, the excitation Y-polarized light, the optical signal Y-polarized light, and the excitation X-polarized light, which are inputted to the optical fiber 140, are subjected to degenerate four-wave mixing for wavelength conversion. The optical signal X-polarized light and the excitation Y-polarized light are wavelength-converted from a C band wavelength to an L band wavelength around the excitation Y-polarized light in the optical fiber 140, and converted X-polarized light is generated. Similarly, the optical signal Y-polarized light and the excitation X-polarized light are wavelength-converted from a C band wavelength to an L band wavelength around the excitation X-polarized light in the optical fiber 140, and converted Y-polarized light is generated. Wavelength conversion from a C band wavelength to an S band wavelength may also be performed by use of degenerate four-wave mixing.

The converted X-polarized light, which is wavelength-converted in the optical fiber 140, the excitation Y-polarized light, and the unconverted optical signal X-polarized light are inputted again by spatial light coupling to the optical function section 100 through the collimator lens 110C. Similarly, the converted Y-polarized light, the excitation X-polarized light, and the unconverted optical signal Y-polarized light are inputted again by spatial light coupling to the optical function section 100 through the collimator lens 110D.

After being inputted to the optical function section 100, the converted X-polarized light, the excitation Y-polarized light, the optical signal X-polarized light, the converted Y-polarized light, the excitation X-polarized light, and the optical signal Y-polarized light are multiplexed by the polarization beam splitter 130 to obtain converted light, excitation light, and an optical signal. The excitation light travels toward the collimator lens 110B, and is extracted by an optical circulator not depicted in FIG. 4. The converted light and the optical signal travel to the wavelength filter 120 in such a state of being orthogonal to each other. The converted light is reflected toward the collimator lens 110E by the wavelength filter 120. The optical signal is extracted by an optical circulator not depicted in FIG. 4. The converted light reflected from the wavelength filter 120 is outputted from the fiber connector 30E through the collimator lens 110E.

In the past, an optical fiber was used to establish a direct connection to an optical function section. However, as a connection section for the optical fiber was not secured, the optical fiber vibrated and caused birefringence. Therefore, the present embodiment is enabled to reduce the influence of birefringence by optically coupling the optical function section 100 to the optical fiber 140 by spatial light coupling. The optical fiber 140 is wound like a coil and retained by the fiber holder section 180.

The optical fiber 140 is wound like a coil because an optical signal is to be wavelength-converted within a limited space and the optical fiber used for wavelength conversion needs to be extended at least a predetermined distance. The optical fiber 140 is placed in the fiber holder section 180 to fix the position and suppress the displacement of the optical fiber 140.

Figure 10:
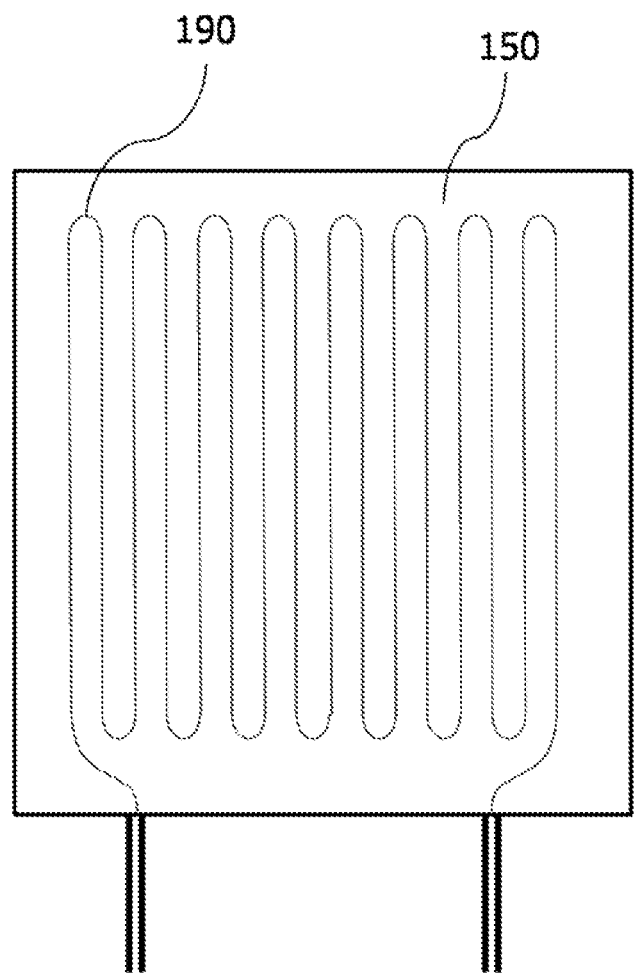
FIG. 10 is a diagram illustrating a temperature control section of a fiber holder section.
Figure 11:
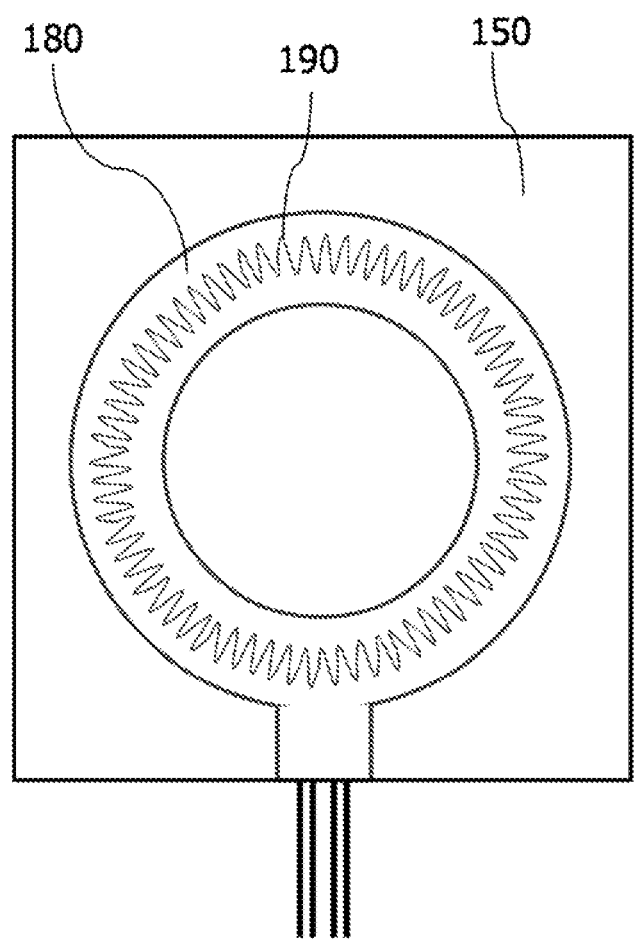
FIG. 11 is a diagram illustrating a temperature control section of a fiber holder section.

The temperature control section 190, which is attached to the bottom surface of the fiber holder section 180, is able to maintain a constant temperature in the optical fiber 140 and the fiber holder section 180. Examples of the temperature control section 190 are depicted in FIGS. 10 and 11. It is advantageous that the temperature control section 190 is able to reduce birefringence in the optical fiber 140.

The fiber holder section 180 uses a resinoid filling material as the filling material 200 surrounding the optical fiber 140. Using the filling material 200 makes it possible to fill gaps around the optical fiber 140 in the fiber holder section 180.

It is advantageous that the filling material 200 is able to secure the optical fiber 140 at a predetermined position in the fiber holder section 180. This makes it possible to suppress the vibration of the optical fiber 140 and reduce birefringence in the optical fiber 140. A sponge-like filling material may be also used as a substitute for the resinoid filling material.

Figure 5:
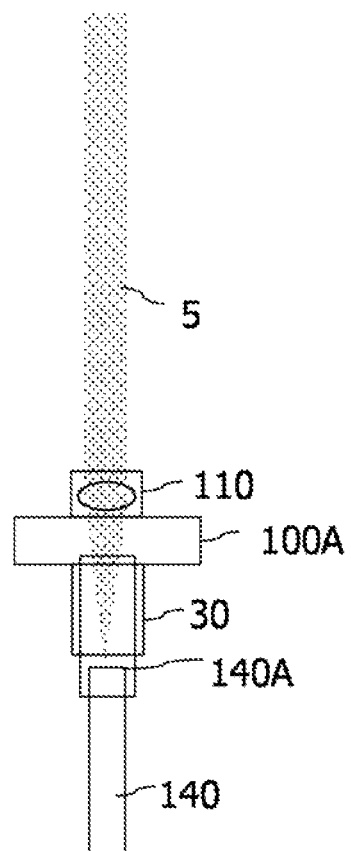
FIG. 5 is an explanatory diagram illustrating the first embodiment.

Spatial light coupling will now be described with reference to FIG. 5.

A bulk lens coupling configuration is adopted in the present embodiment. The bulk lens coupling configuration combines individual parts and achieves spatial light coupling. The bulk lens coupling configuration is formed by the collimator lenses 110 and the fiber connectors 30. The fiber connectors 30 are disposed on a lateral wall 100A. The positions of the fiber connectors 30 may be adjusted by moving the fiber connectors 30 upward, downward, leftward, or rightward on the lateral wall 100A. The position of the optical fiber 140 is also adjustable. Accordingly, an optical fiber end face 140A may be positioned at a focus of an optical signal to reduce an optical loss.

Figure 6:
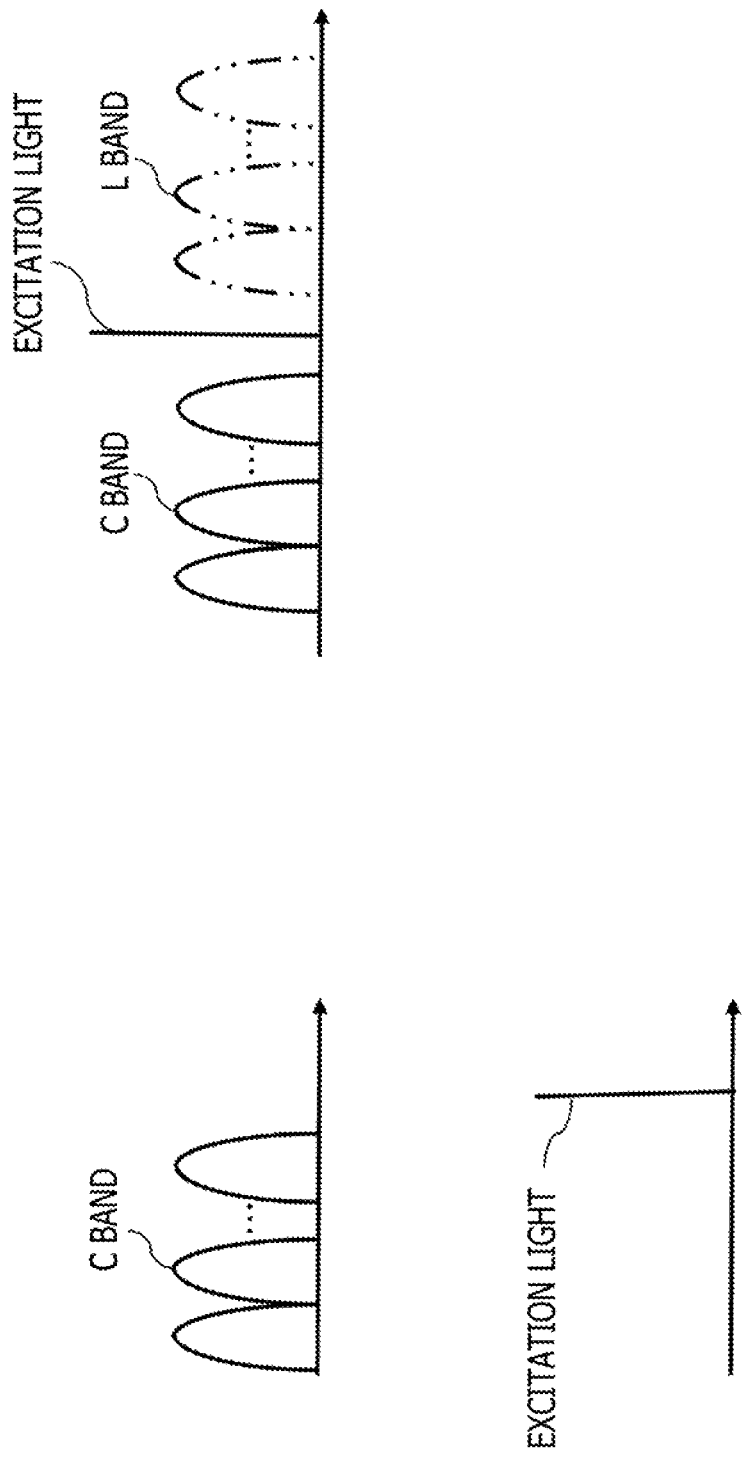
FIG. 6 is a simplified diagram illustrating wavelength conversion according to the first embodiment.

FIG. 6 is a diagram illustrating wavelength conversion in the optical fiber 140.

The optical signal in the present embodiment has a C band wavelength and is to be converted in the optical fiber 140 to an L band wavelength. FIG. 6 illustrates a case where wavelength conversion is performed from a C band wavelength to an L band wavelength.

The optical signal X-polarized light, excitation Y-polarized light, optical signal Y-polarized light, and excitation X-polarized light incident on the optical fiber 140 from the optical function section 100 may be wavelength-converted to converted X-polarized light and converted Y-polarized light. A degenerate four-wave mixing scheme is used in the optical fiber 140 such that the optical signal X-polarized light and the optical signal Y-polarized light are symmetrically wavelength-converted from a C band wavelength to an L band wavelength around the wavelengths of excitation X-polarized light and excitation Y-polarized light, respectively.

Figure 7:
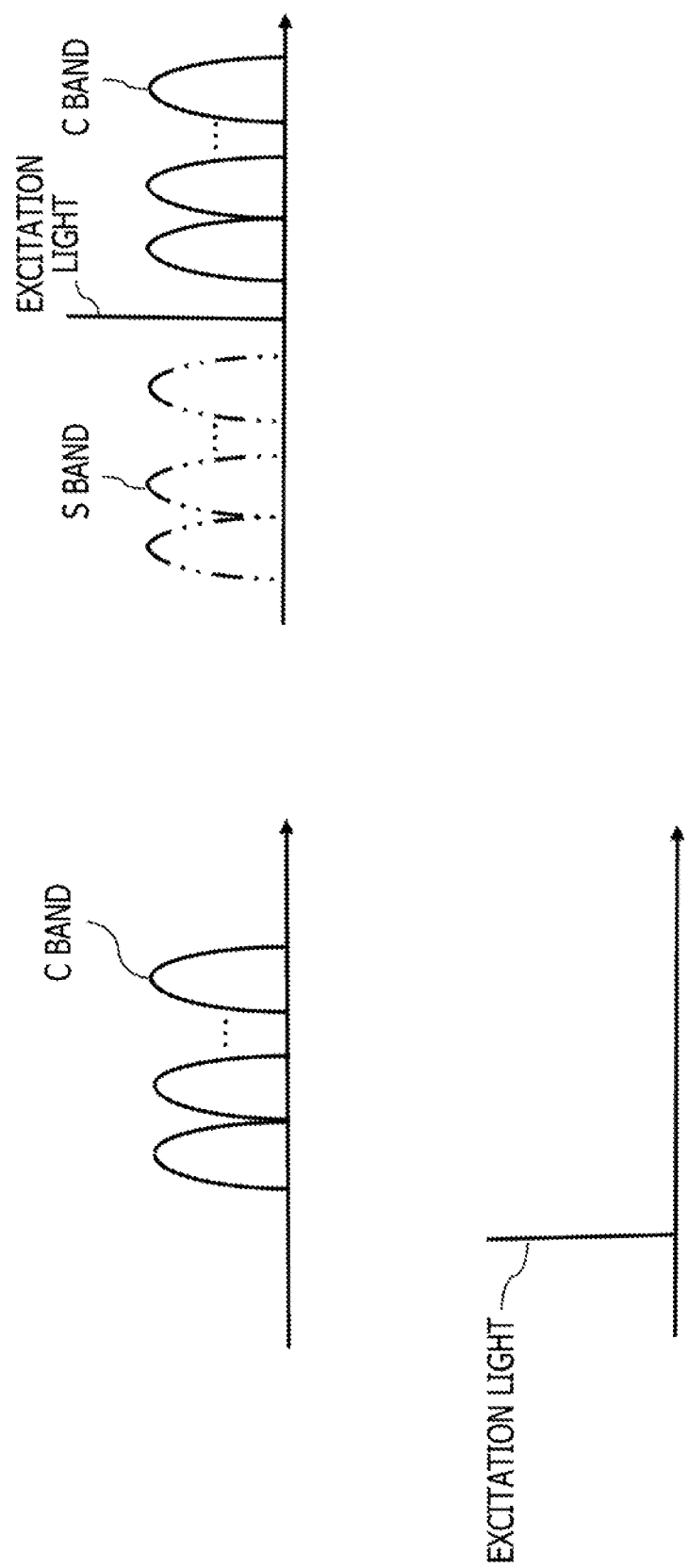
FIG. 7 is a simplified diagram illustrating wavelength conversion according to the first embodiment.

When the degenerate four-wave mixing scheme is adopted, wavelength conversion may also be performed from a C band wavelength to an S band wavelength as depicted in FIG. 7.

Although not depicted in FIG. 6, wavelength conversion may also be performed, for example, from an S band wavelength to a C band wavelength and from an L band wavelength to a C band wavelength.

The present embodiment makes it possible to perform wavelength conversion and inhibit birefringence from being caused by the vibration of a non-linear optical fiber. It is also possible to perform wavelength conversion and inhibit birefringence from being caused by temperature changes in the non-linear optical fiber.

Second Embodiment

A transmission system according to a second embodiment is configured such that the optical function section 100 used in the first embodiment additionally includes ¼ wavelength plates 160A and 160B and ½ wavelength plates 170A and 170B. The ¼ wavelength plate 160A and the ½ wavelength plate 170A are disposed between the polarization beam splitter 130 and the collimator lens 110D. The ¼ wavelength plate 160B and the ½ wavelength plate 170B are disposed between the polarization beam splitter 130 and the collimator lens 110C.

Figure 8:
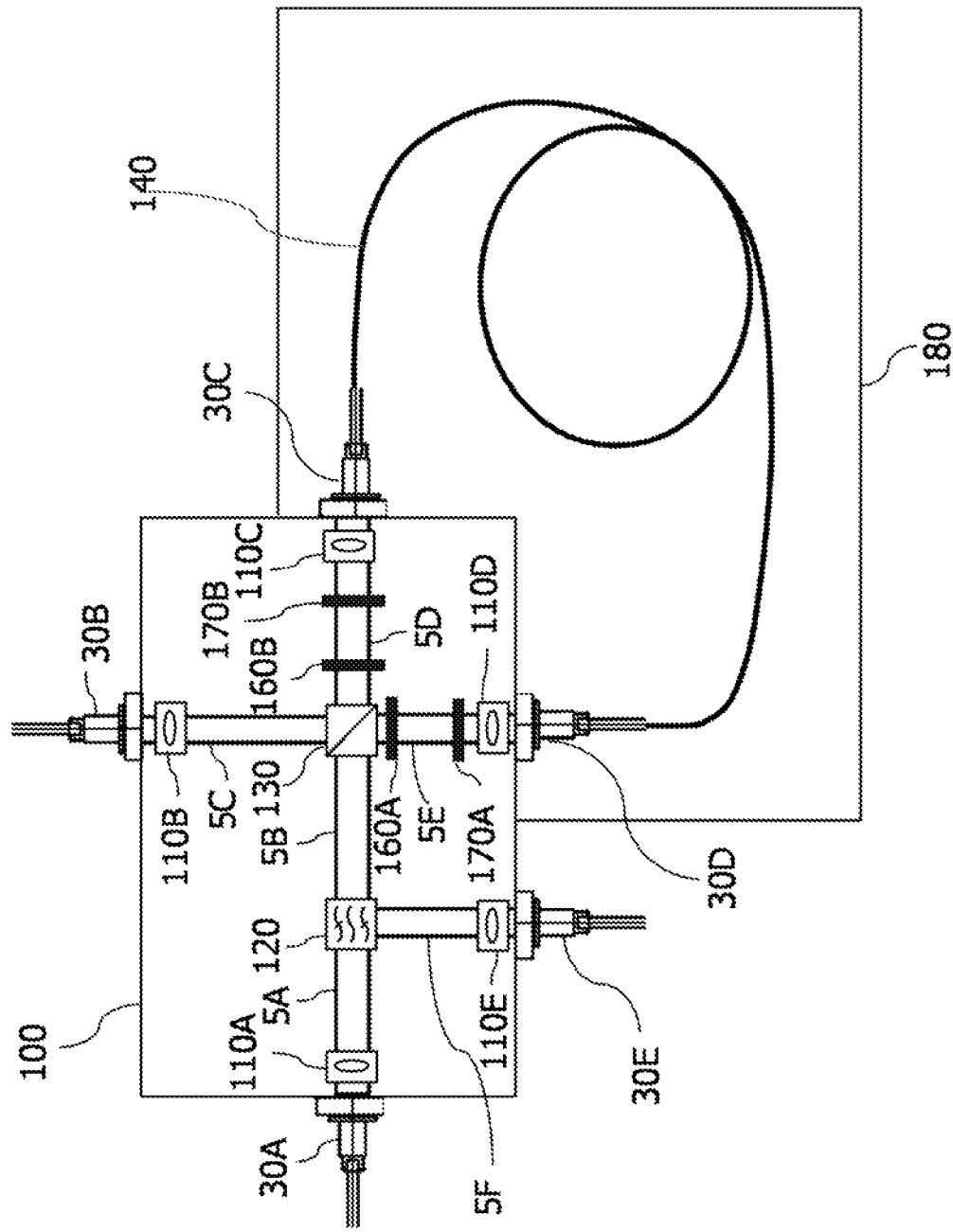
FIG. 8 is an explanatory diagram illustrating a second embodiment.

FIG. 8 is a diagram illustrating an exemplary configuration of the wavelength converter 1 according to the second embodiment.

As Illustrated in FIG. 8, the optical function section 100 in the second embodiment is configured such that the ¼ wavelength plate 160A and the ½ wavelength plate 170A are disposed between the polarization beam splitter 130 and the collimator lens 110D, and that the ¼ wavelength plate 160B and the ½ wavelength plate 170B are disposed between the polarization beam splitter 130 and the collimator lens 110C.

The ¼ wavelength plates 160 are able to provide a phase difference of λ/4 with respect to a polarization plane of incident light. When the polarization plane of incident light is at an angle of 45 degrees from a high-speed shaft of the wavelength plates, linearly polarized light may be converted into a circular polarization state. Conversely, circularly polarized light may be converted into a linear polarization state. Light incident at an angle other than 45 degrees is put into an elliptical polarization state.

The ½ wavelength plates 170 are able to provide a phase difference of λ/2 with respect to the polarization plane of incident light. It signifies that, when the polarization plane of incident light is at an angle of θ from the high-speed shaft of the wavelength plates, the vibration direction of the incident light is rotated by 2×θ degrees. If the incident light is incident at an angle of 45 degrees, the maximum rotation angle may be rotated by 90 degrees. Accordingly, when the polarization plane of a laser is to be changed, the polarization plane may be moved by using the ½ wavelength plate 170 without having to rotate the laser. When circularly polarized light is incident, the rotation direction of polarization may be reversed.

In the present embodiment, the ¼ wavelength plates 160 and the ½ wavelength plates 170 are disposed in the order on a side closer to the polarization beam splitter 130.

The polarization beam splitter 130 divides an optical signal and excitation light into optical signal X-polarized light, optical signal Y-polarized light, excitation X-polarized light, and excitation Y-polarized light.

After division, the optical signal X-polarized light, the excitation Y-polarized light, the optical signal Y-polarized light, and the excitation X-polarized light travel in the optical function section 100. The optical signal X-polarized light and the excitation Y-polarized light maintain an orthogonal state, are outputted from the fiber connector 30D to the optical fiber 140 through the collimator lens 110D, and are subjected to wavelength conversion in the optical fiber 140. Similarly, the optical signal Y-polarized light and the excitation X-polarized light maintain an orthogonal state, are outputted from the fiber connector 30C to the optical fiber 140 through the collimator lens 110C, and are subjected to wavelength conversion in the optical fiber 140.

After being divided by the polarization beam splitter 130, the optical signal X-polarized light, the excitation Y-polarized light, the optical signal Y-polarized light, and the excitation X-polarized light travel in a state of remaining in the orthogonal state. Therefore, when expressed in vector form, the optical signal X-polarized light, the excitation Y-polarized light, the optical signal Y-polarized light, and the excitation X-polarized light travel at an angle of 45 degrees. As the optical signal X-polarized light, the excitation Y-polarized light, the optical signal Y-polarized light, and the excitation X-polarized light pass through the ¼ wavelength plates 160 and the ½ wavelength plates 170, the optical signal X-polarized light, the excitation Y-polarized light, the optical signal Y-polarized light, and the excitation X-polarized light are able to be incident on the optical fiber 140 in the circular polarization state. As the optical signal X-polarized light, the excitation Y-polarized light, the optical signal Y-polarized light, and the excitation X-polarized light are incident in the circular polarization state, wavelength conversion may be efficiently performed in the optical fiber 140.

The converted X-polarized light, which is wavelength-converted in the optical fiber 140, the excitation Y-polarized light, and the unconverted optical signal X-polarized light are inputted again by spatial light coupling to the optical function section 100 through the collimator lens 110C. Similarly, the converted Y-polarized light, the excitation X-polarized light, and the unconverted optical signal Y-polarized light are inputted again by spatial light coupling to the optical function section 100 through the collimator lens 110D.

Subsequently, the above light is multiplexed by the polarization beam splitter 130, and converted light, excitation light, and an optical signal are obtained. The excitation light travels toward the collimator lens 110B, and is extracted by an optical circulator not depicted in FIG. 8. The converted light and the optical signal travel to the wavelength filter 120 in a state of being orthogonal to each other. The converted light is reflected toward the collimator lens 110E by the wavelength filter 120. The optical signal is extracted by an optical circulator not depicted in FIG. 8. The converted light reflected from the wavelength filter 120 is outputted from the fiber connector 30E through the collimator lens 110E.

The present embodiment makes it possible to reduce occurrence of erroneous wavelength conversion and wavelength shift in the optical fiber 140.

Third Embodiment

Figure 9:
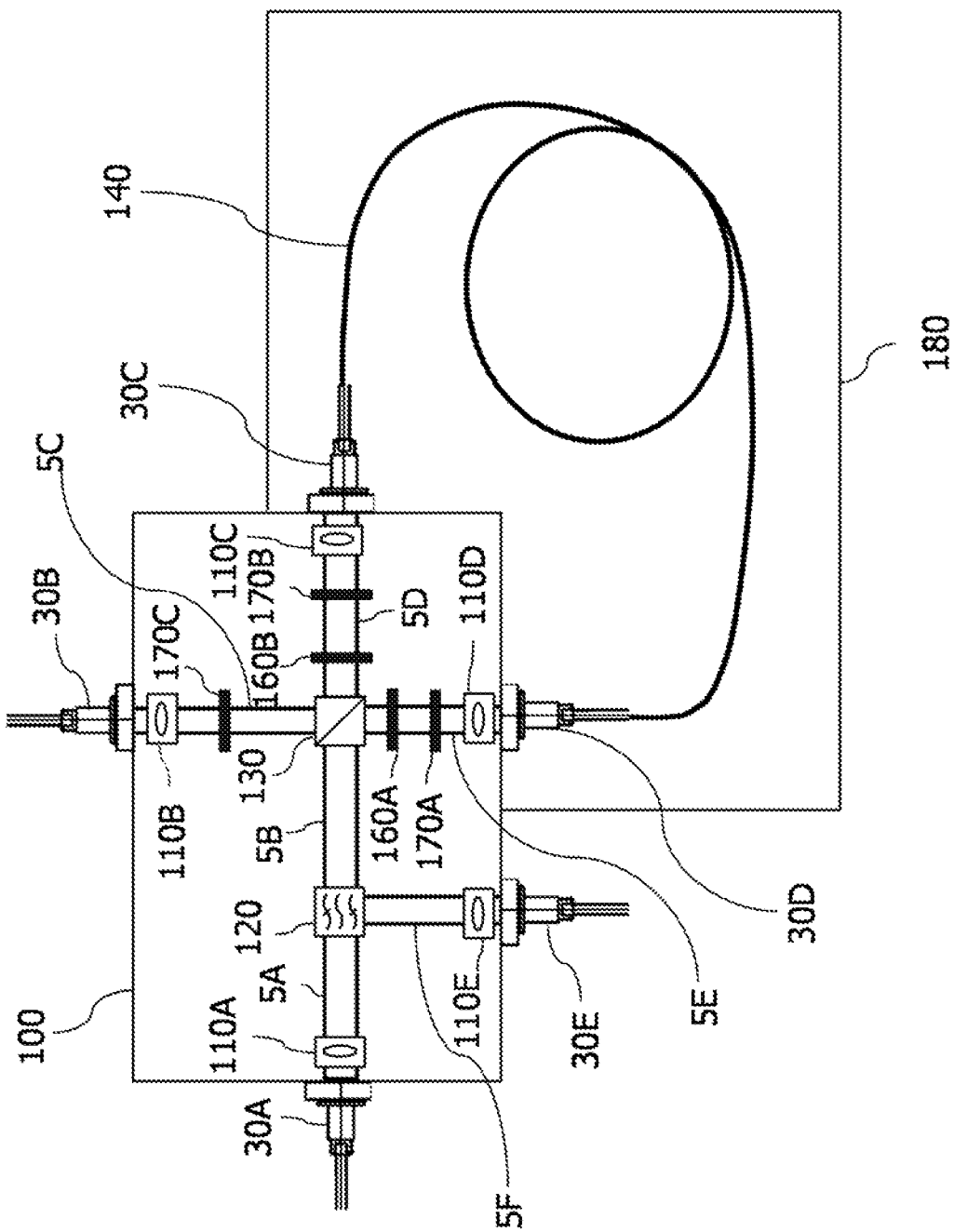
FIG. 9 is an explanatory diagram illustrating a third embodiment.

A transmission system according to a third embodiment is configured such that the optical function section 100 used in the first embodiment additionally includes a ½ wavelength plate 170C, and includes the ¼ wavelength plates 160A and 1608B and the ½ wavelength plates 170A and 170B, as is the case with the second embodiment. The ½ wavelength plate 170C is disposed between the polarization beam splitter 130 and the collimator lens 110B. The ¼ wavelength plate 160A and the ½ wavelength plate 170A are disposed between the polarization beam splitter 130 and the collimator lens 110D. The ¼ wavelength plate 160B and the ½ wavelength plate 170B are disposed between the polarization beam splitter 130 and the collimator lens 110C. FIG. 9 is a diagram illustrating an exemplary configuration of the wavelength converter 1 according to the third embodiment.

As Illustrated in FIG. 9, the optical function section 100 in the third embodiment is configured such that the ½ wavelength plate 170C is disposed between the polarization beam splitter 130 and the collimator lens 110B, and that the ¼ wavelength plate 160A and the ½ wavelength plate 170A are disposed between the polarization beam splitter 130 and the collimator lens 110D, and further that the ¼ wavelength plate 160B and the ½ wavelength plate 170B are disposed between the polarization beam splitter 130 and the collimator lens 110C.

As the ½ wavelength plate 170C is disposed between the polarization beam splitter 130 and the collimator lens 110B, it is possible to adjust the polarization plane of excitation light. This enables the polarization beam splitter 130 to divide the excitation light at an ideal angle.

The polarization beam splitter 130 divides an optical signal and excitation light into optical signal X-polarized light, optical signal Y-polarized light, excitation X-polarized light, and excitation Y-polarized light.

After division, the optical signal X-polarized light, the excitation Y-polarized light, the optical signal Y-polarized light, and the excitation X-polarized light travel in the optical function section 100. The optical signal X-polarized light and the excitation Y-polarized light maintain an orthogonal state, are outputted from the fiber connector 30D to the optical fiber 140 through the collimator lens 110D, and are subjected to wavelength conversion in the optical fiber 140. Similarly, the optical signal Y-polarized light and the excitation X-polarized light maintain an orthogonal state, are outputted from the fiber connector 30C to the optical fiber 140 through the collimator lens 110C, and are subjected to wavelength conversion in the optical fiber 140.

After being divided by the polarization beam splitter 130, the optical signal X-polarized light, the excitation Y-polarized light, the optical signal Y-polarized light, and the excitation X-polarized light travel while remaining in the orthogonal state. Therefore, when expressed in vector form, the optical signal X-polarized light, the excitation Y-polarized light, the optical signal Y-polarized light, and the excitation X-polarized light travel at an angle of 45 degrees. As the optical signal X-polarized light, the excitation Y-polarized light, the optical signal Y-polarized light, and the excitation X-polarized light pass through the ¼ wavelength plates 160 and the ½ wavelength plates 170, the optical signal X-polarized light, the excitation Y-polarized light, the optical signal Y-polarized light, and the excitation X-polarized light are able to be incident on the optical fiber 140 in the circular polarization state. As the optical signal X-polarized light, the excitation Y-polarized light, the optical signal Y-polarized light, and the excitation X-polarized light are incident in the circular polarization state, wavelength conversion may be efficiently performed in the optical fiber 140.

The converted X-polarized light which is wavelength-converted in the optical fiber 140, the excitation Y-polarized light, and the unconverted optical signal X-polarized light are inputted again by spatial light coupling to the optical function section 100 through the collimator lens 110C. Similarly, the converted Y-polarized light, the excitation X-polarized light, and the unconverted optical signal Y-polarized light are inputted again by spatial light coupling to the optical function section 100 through the collimator lens 110D.

Subsequentiy, the above light is multiplexed by the polarization beam splitter 130 to obtain converted light, excitation light, and an optical signal. The excitation light travels toward the collimator lens 110B, and is extracted by an optical circulator not depicted in FIG. 9. The converted light and the optical signal travel to the wavelength filter 120 in a state of being orthogonal to each other. The converted light is reflected toward the collimator lens 110E by the wavelength filter 120. The optical signal is extracted by an optical circulator not depicted in FIG. 9. The converted light reflected from the wavelength filter 120 is outputted from the fiber connector 30E through the collimator lens 110E.

The present embodiment makes it possible to reduce occurrence of erroneous wavelength conversion and wavelength shift in the optical fiber 140.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength converter for converting a wavelength of an optical signal, the wavelength converter comprising:
    an excitation light source configured to output excitation light;
    a beam splitter configured to receive an input of the excitation light and an input of the optical signal and to divide both the inputted excitation light and the inputted optical signal into a first polarization component and a second polarization component;
    a non-linear optical fiber configured as a non-polarization-maintaining fiber;
    an accommodation section configured to secure and accommodate the non-linear optical fiber;
    a first collimator lens disposed between the beam splitter and a first end of the non-linear optical fiber; and
    a second collimator lens disposed between the beam splitter and a second end of the non-linear optical fiber,
    wherein the optical signal is inputted to the beam splitter from a direction different from the input of the excitation light, and
    the optical signal is wavelength-converted by inputting the first polarization component of the excitation light and the second polarization component of the optical signal from the first end to the non-linear optical fiber through the first collimator lens and inputting the second polarization component of the excitation light and the first polarization component of the optical signal from the second end to the non-linear optical fiber through the second collimator lens.

2. The wavelength converter according to claim 1, further comprising:
    a third collimator lens disposed between the excitation light source and the beam splitter.

3. The wavelength converter according to claim 2, further comprising:
    a ½ wavelength plate disposed between the third collimator lens and the beam splitter.

4. The wavelength converter according to claim 1, further comprising:
    a ½ wavelength plate and a ¼ wavelength plate that are disposed between the beam splitter and the first collimator lens and between the beam splitter and the second collimator lens, respectively.

5. The wavelength converter according to claim 1, further comprising:
    a temperature control section configured to maintain a constant temperature in the accommodation section accommodating the non-linear optical fiber.

6. The wavelength converter according to claim 1,
    wherein the non-linear optical fiber is secured to the accommodation section by using a filling material.

7. The wavelength converter according to claim 1,
    wherein the excitation light source and the beam splitter are coupled with a polarization-maintaining fiber.

8. A transmission apparatus for transmitting wavelength-multiplexed light to a transmission path, the transmission apparatus comprising:
    a first multiplexing section configured to output first multiplex light by multiplexing light of a wavelength in a first wavelength band;
    a second multiplexing section configured to output second multiplex light by multiplexing light of a wavelength in the first wavelength band;
    a wavelength conversion section configured to convert the wavelength of the second multiplex light to a wavelength in a second wavelength band, the second wavelength band being different from the first wavelength band; and
    a third multiplexing section configured to output the wavelength-multiplexed light by multiplexing the first multiplex light and the second multiplex light, the wavelength of the second multiplex light being converted to the wavelength in the second wavelength band;
    wherein the wavelength conversion section includes
    an excitation light source configured to output excitation light,
    a beam splitter configured to receive an input of the excitation light and an input of the second multiplex light and to divide both the inputted excitation light and the inputted second multiplex light into a first polarization component and a second polarization component,
    a non-linear optical fiber configured as a non-polarization-maintaining fiber,
    an accommodation section configured to secure and accommodate the non-linear optical fiber,
    a first collimator lens disposed between the beam splitter and a first end of the non-linear optical fiber, and a second collimator lens disposed between the beam splitter and a second end of the non-linear optical fiber, the second multiplex light is inputted to the beam splitter from a direction different from the input of the excitation light, and the second multiplex light is wavelength-converted by inputting the first polarization component of the excitation light and the second polarization component of the second multiplex light from the first end to the non-linear optical fiber through the first collimator lens and inputting the second polarization component of the excitation light and the first polarization component of the second multiplex light from the second end to the non-linear optical fiber through the second collimator lens.

* * * * *